US006281811B1

(12) United States Patent
Ranzino

(10) Patent No.: US 6,281,811 B1
(45) Date of Patent: Aug. 28, 2001

(54) COMMUNICATION AND LOCATION SYSTEM FOR SHOPPING MALLS, PARKS, BUSINESS DISTRICTS, AND THE LIKE

(76) Inventor: Anthony S Ranzino, 65 College Ave., Medford, MA (US) 02155

( * ) Notice: Subject to any disclaimer, the term of this patent is extended or adjusted under 35 U.S.C. 154(b) by 0 days.

(21) Appl. No.: 09/330,890

(22) Filed: Jun. 11, 1999

(51) Int. Cl.[7] ................................................. G08G 1/123
(52) U.S. Cl. ........................ 340/988; 340/539; 342/457; 701/300
(58) Field of Search ................................. 340/988, 990, 340/995, 539; 701/208, 211, 213, 300; 342/457

(56) References Cited

U.S. PATENT DOCUMENTS

| | | | |
|---|---|---|---|
| 5,014,206 | * | 5/1991 | Scribner et al. ........................ 342/457 |
| 5,579,535 | * | 11/1996 | Orlen et al. ............................ 340/995 |
| 5,948,040 | * | 9/1999 | DeLorme et al. ..................... 340/990 |
| 6,064,323 | * | 5/2000 | Ishii et al. ............................. 340/995 |
| 6,091,956 | * | 7/2000 | Hollenberg ............................ 455/456 |

* cited by examiner

Primary Examiner—Brent A. Swarthout
(74) Attorney, Agent, or Firm—Mark P. White

(57) ABSTRACT

A communication and location system provides a user with means to locate himself/herself within an area, typically a shopping mall, theme park, or the like, using voice commands. The system includes a multiplicity of IR sensors connected to a central computer, an RF receiver, voice recognition and generation equipment, and databases contained within the computer system. The user wears a headset containing an earphone, microphone, RF transmitter and receiver, and IR transmitter. The area contains a number of IR sensors which pickup the user's IR transmission, locating the user within the area. The user speaks into the microphone, using keywords to describe the user's resource of interest within the area. The user's IR transmission is encoded, so that the user is identified for location. The user's voice transmission is likewise encode, for identification. The keyword is used to identify the resource of interest, and the system responds with voice generation means, over the RF system providing information of interest related to the resource of interest in proximity to the user's location.

2 Claims, 4 Drawing Sheets

COMMUNICATION AND LOCATION SYSTEM FOR SHOPPING MALLS, PARKS, BUSINESS DISTRICTS, AND THE LIKE

PROSECUTION HISTORY

1. Field of the Invention

The present invention relates systems for personal location and communication, and more specifically, to systems providing means for a person to locate himself in areas such as parks, malls, business districts, or the like, and to further locate resources of interest within that area.

2. Description Relative to the Prior Art

Modern society provides a variety of extended areas with a multiplicity of resources. Examples of these are theme parks, Malls, business districts, college campuses, museums, and shopping areas are a few examples. In such areas, visitors must identify and locate resources of interest to them.

In a shopping mall, for example, visitors often have specific products of interest in mind, either to purchase, or to examine. Malls assist shoppers in locating stores selling these products by providing maps at various locations within the mall. These maps are helpful, but do not generally give very much detail about the products sold within the store, except in a very general way.

Museums often augment maps of exhibits with audio programs which can be purchased in the form of audio tape players, including headsets or earphones so that the program is heard only by a single user, who can regulate the program to fit his/her needs.

The present invention further develops the concepts of location and information to provide interaction between the visitor and the resources, enabling the visitor to more easily locate the resources desired, but to retrieve specific information of interest regarding the resource.

As an example, the visitor to a shopping mall may not only want to know what shoe stores are present within the mall, but what kind of shoes they have, what price ranges are available, etc. In the case of theme parks, the visitor may be informed of the location of a ride, as well as the waiting time at the particular ride.

SUMMARY OF THE INVENTION

It is the general object of this invention to provide a system for assisting persons at shopping malls, theme parks, and the like to locate specific areas of interest, and to receive information regarding these specific areas of interest. It is a further general object of this invention to provide such a system which is lightweight, unobtrusive to carry and use, and easy to use. It is a specific object of this invention to provide such a system by means of infra-red locating systems, in conjunction with radio-frequency communication systems, operating through a computer system.

According to one aspect of the invention, a personal location and communication system is intended for locating a person within an area containing resources, for communicating the person's specific interests to the system, and for communicating information regarding the resources related to said interests to the person. The system includes computation means to store a database of interests, of resources related to said interests, and of the geographic locations of said resources. It further includes means for geographically locating the person to an accuracy of several feet; designation means for communication a specific interest from the person to the system, computation means for storing said specific interest and person's location, distance-determination computation means to determine distances from the person to each resource related to said specific interest, and directions allowing the person to reach each resource. In addition, it includes transmission means for communicating to the person. These transmission means further includes, for each resource related to said specific interest, the resource location, characteristics of the resource related to the specific interest, and the direction for reaching the resource.

According to a second aspect of the invention, the means for locating the person further includes a multiplicity of point-to-point sensors, one of which is located in proximity to each resource, and a point-to-point emitter attached to the person.

According to a third aspect of the invention, the emitters are infra-red emitters, and the sensors are infra-red sensors.

According to a fourth aspect of the invention, the emitter further includes means for generating and emitting a unique code uniquely identifying the person within the area, and the sensors further comprise means for sensing said unique code.

According to a fifth aspect of the invention, the transmission and reception means for communication further include radio-frequency means.

According to a sixth aspect of the invention, the means for communication further includes unique identification means for identifying the person for whom the communication is intended, and from whom the communication originates.

According to a seventh aspect of the invention, the means for designation further includes microphone means, voice recognition means, keyword means, and computation means.

According to a eighth aspect of the invention, the distance-determination means further comprises a history database including, for each person, a multiplicity of records, each of which further includes a time and date, and the location of the person at that time and date.

According to a ninth aspect of the invention, the distance-determination means further includes extrapolation means to determine the current position of the person based on the history database.

BRIEF DESCRIPTION OF THE DRAWINGS

These, and further features of the invention, may be better understood with reference to the accompanying specification and drawings depicting the preferred embodiment, in which.

DETAILED DESCRIPTION OF THE PREFERRED EMBODIMENTS

Definitions

In the following description, the following definitions will apply

AREA: the geographic location containing all of the resources to be located. AREA may refer to a theme park, shopping mall, etc.

Resources: the places within the AREA to be identified. In a shopping mall, the resources may include stores, restaurants, etc. In a theme park, the resources may include rides and exhibits.

Attributes: characteristics of the resource. In a shopping mall, the attributes of a shoe store (resource) may be models available, and prices of the models. In a theme park, the attributes of an exhibit (resource) may include hours the exhibit is open, current waiting times, and prices to enter the exhibit.

Figure 1:
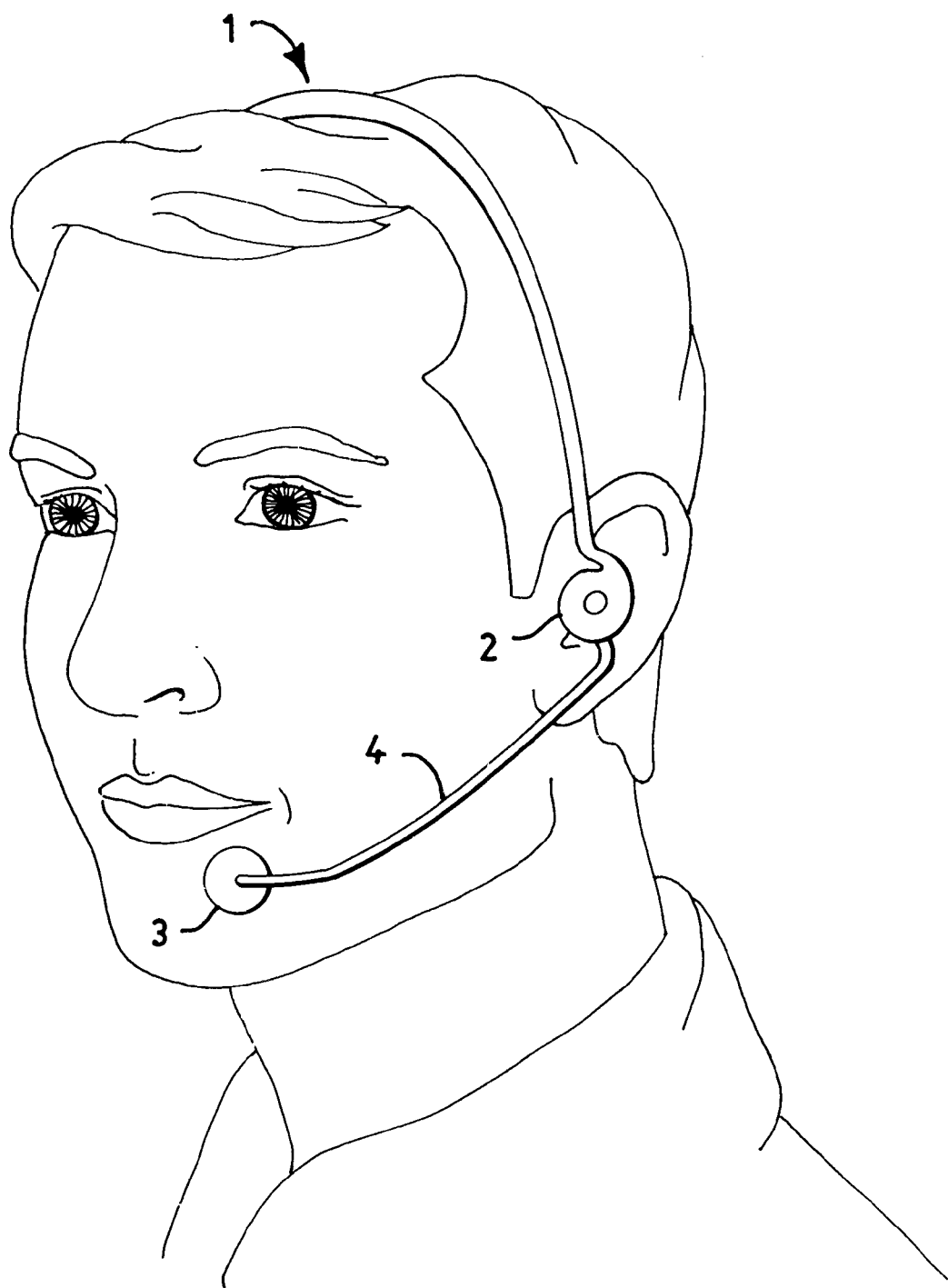
FIG. 1 depicts a user wearing the headset.

The invention may be understood by first referring to FIG. 1, which depicts a user wearing a headset which is a component of the first preferred embodiment. The headset includes a headband 1, an earpiece 2, through which communications with the system are received, a mouthpiece 3, containing a microphone through which the user sends messages to the system, and a Lucite®[1] tube 4, which supports the mouthpiece and contains wiring connecting the mouthpiece with the rest of the system.

[1] Lucite is a Registered trademark of E. I. Dupont de Nemours and Company, Wilmington, Del.

The headset contains a battery and electronics to provide transmission and reception of radio-frequency signals, not shown in this drawing. In one embodiment, the headset also contains an infra-red (IR) detector, which is used to locate the headset vis-à-vis an array of IR transmitters located throughout the AREA. In another embodiment, the headset contains an IR transmitter, whereas the AREA contains a number of receivers located at strategic locations throughout.

Figure 2:
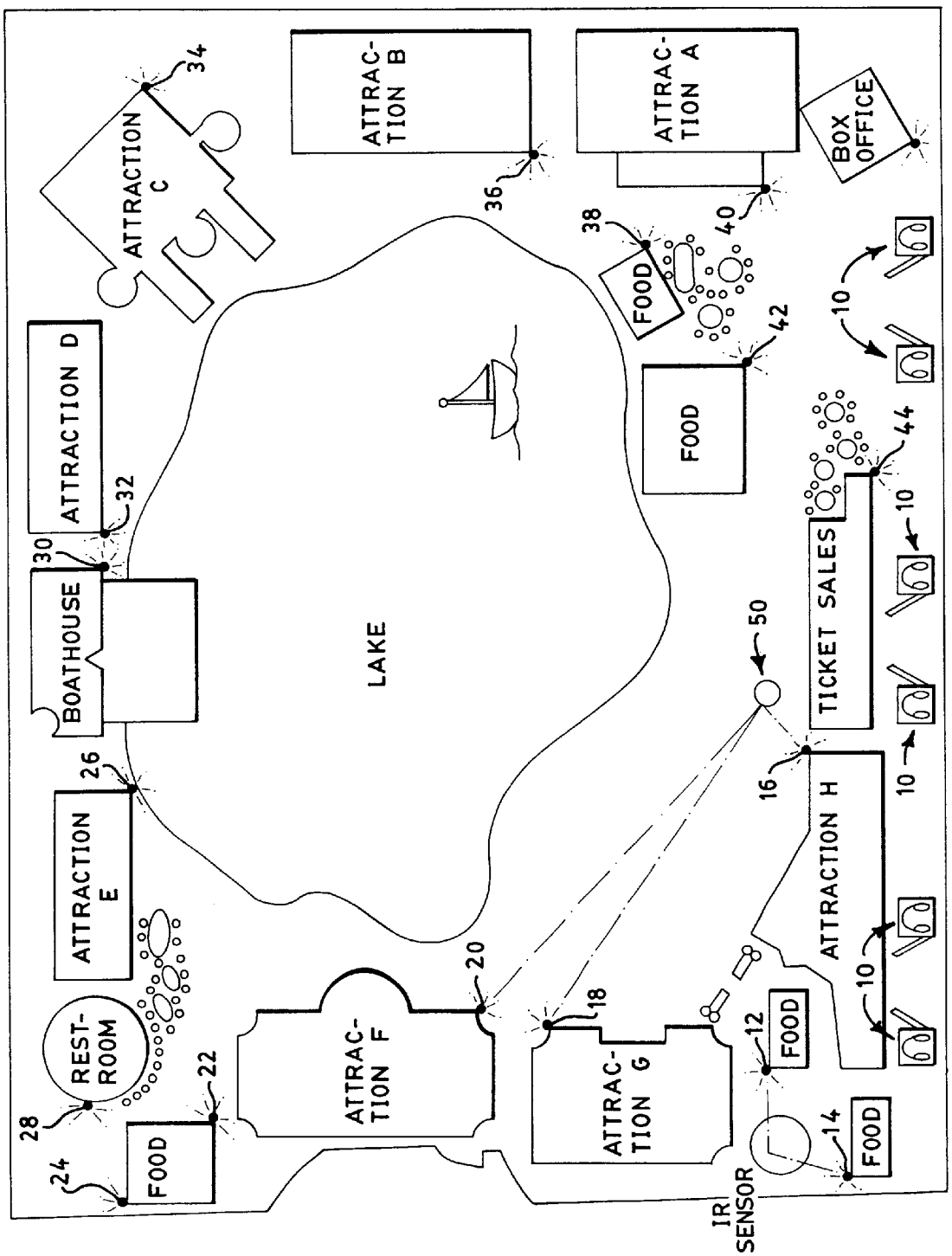
FIG. 2 depicts a plan view of a portion of Epcot Center, with the IR sensors of the current invention installed.

Referring now to FIG. 2, an approximation of part of the Epcot Center®[2] is depicted, showing how the current invention is incorporated. The visitor may purchase or rent headsets at a number of kiosks 10 located near the entrance. The IR sensors 12 through 44 are located at various locations throughout the AREA.

[2] Epcot is a Registered trademark of Walt Disney Productions, Hollywood, Calif.

A user located at 50 may thus transmit toward detectors (sensors) 16, 18, and 20. Depending upon the range of the transmitter (emitter), any or all of these detectors may pickup the signal transmitted from location. IR sensors are highly directional, and the user must be facing in the proper direction for strong reception by the sensors. However, as the user proceeds through the AREA, he/she will move about in a way that triggers various of the sensors.

The signal emitted by the user is encoded with a unique identifier. Thus, an IR sensor, receiving a signal from a particular headset, is able to identify the headset and distinguish from signals emitted by other users.

Figure 3:
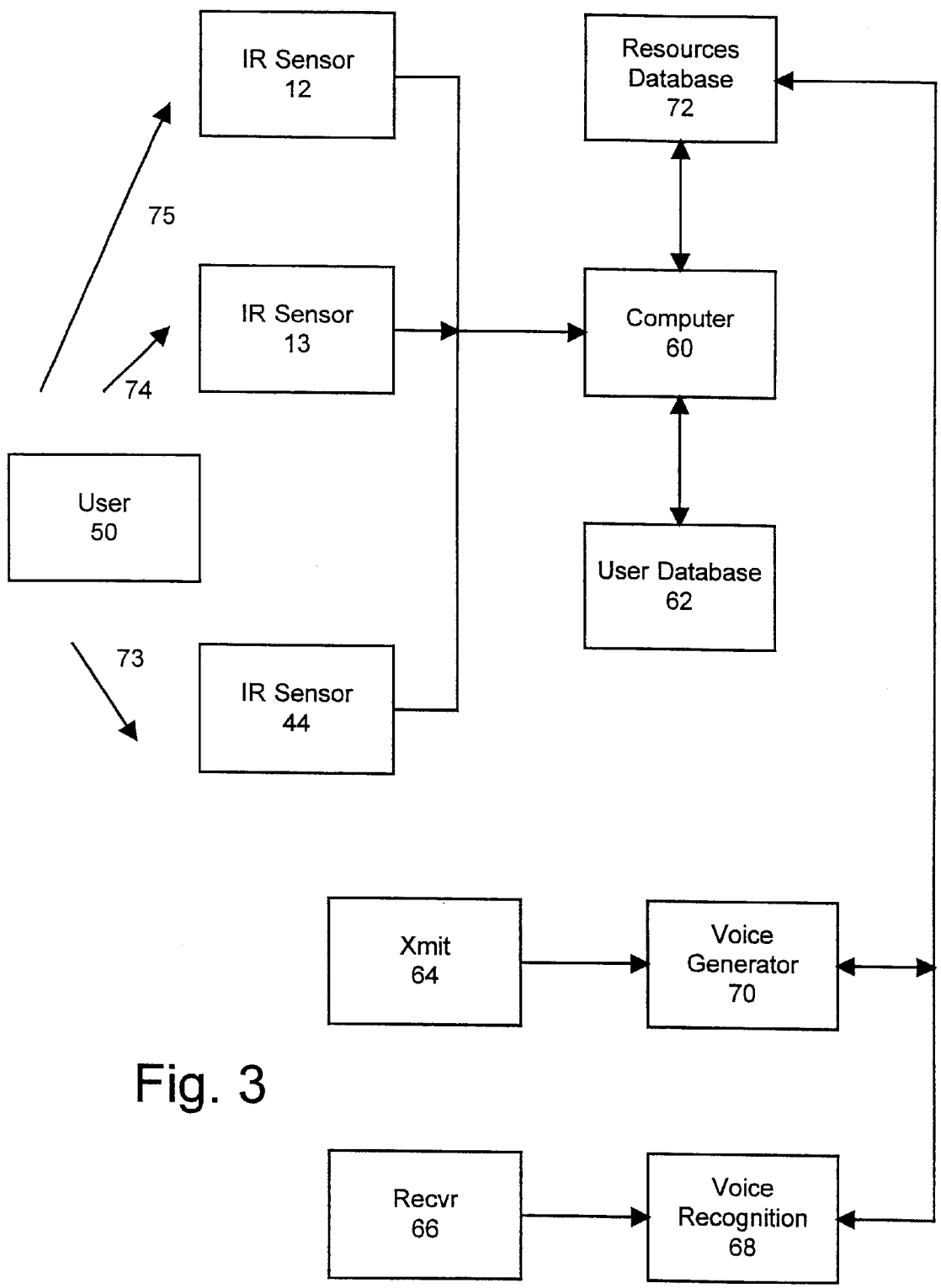
FIG. 3 depicts a block diagram of the invention, showing the components which make up the invention.

Referring now to FIG. 3, it is seen that the outputs of the sensors 12 through 44 are electrically connected to a central computer 60. This computer contains a database 62 which maintains a history of each user currently on the system. This history contains the location of the headset sensed, the location of the sensor, and the time of sensing, all for the last several locations detected. This information is used to extrapolate the location of the user when he/she is not currently picked up by one of the sensors.

Still referring to FIG. 3, a second database 72 contains a list of resources in the AREA, and the location each. This database is used to determine the resources closest to the user when commanded to do so by the computer 60.

Still referring to FIG. 3, a radio-frequency (RF) receiver 66 is tuned to the same frequency as the headsets, and detects communications from the headsets. The signals detected by the receivers are sent to a voice recognition system 68, where they are translated into specific key-word commands which are then sent to the computer 60. Upon command from the computer, a voice generator system 70, will send voice signals to the transmitter 64, for broadcast back to the user.

Because a number of users are sharing the same bandwidth, means are included to distinguish between the RF signals of different users, both at the receiver and transmitter end. A number of different techniques may be used to accomplish this discrimination.

First of all, if the number of users are not prohibitively large, different users may use different frequencies. Using this technique, each transmitter will transmit at a different frequency. The receiver must have a bandwidth large enough to receive all frequencies, and the individual signals are separated by filtering after detection, or by any of a number of other well-known techniques.

Another possible technique is use of the so-called spread-spectrum technology, wherein the transmission frequency is modulated by a pseudo-random noise (PRN) signal, wherein the PRN signal is derived from the unique code identifying each user. Such technology is used in modern data communications.

Other digital techniques are available to distinguish between different signals from different sources by organizing the data into packets, and using codes identifying the source within each packet, as is used in network communications techniques.

Figure 4:
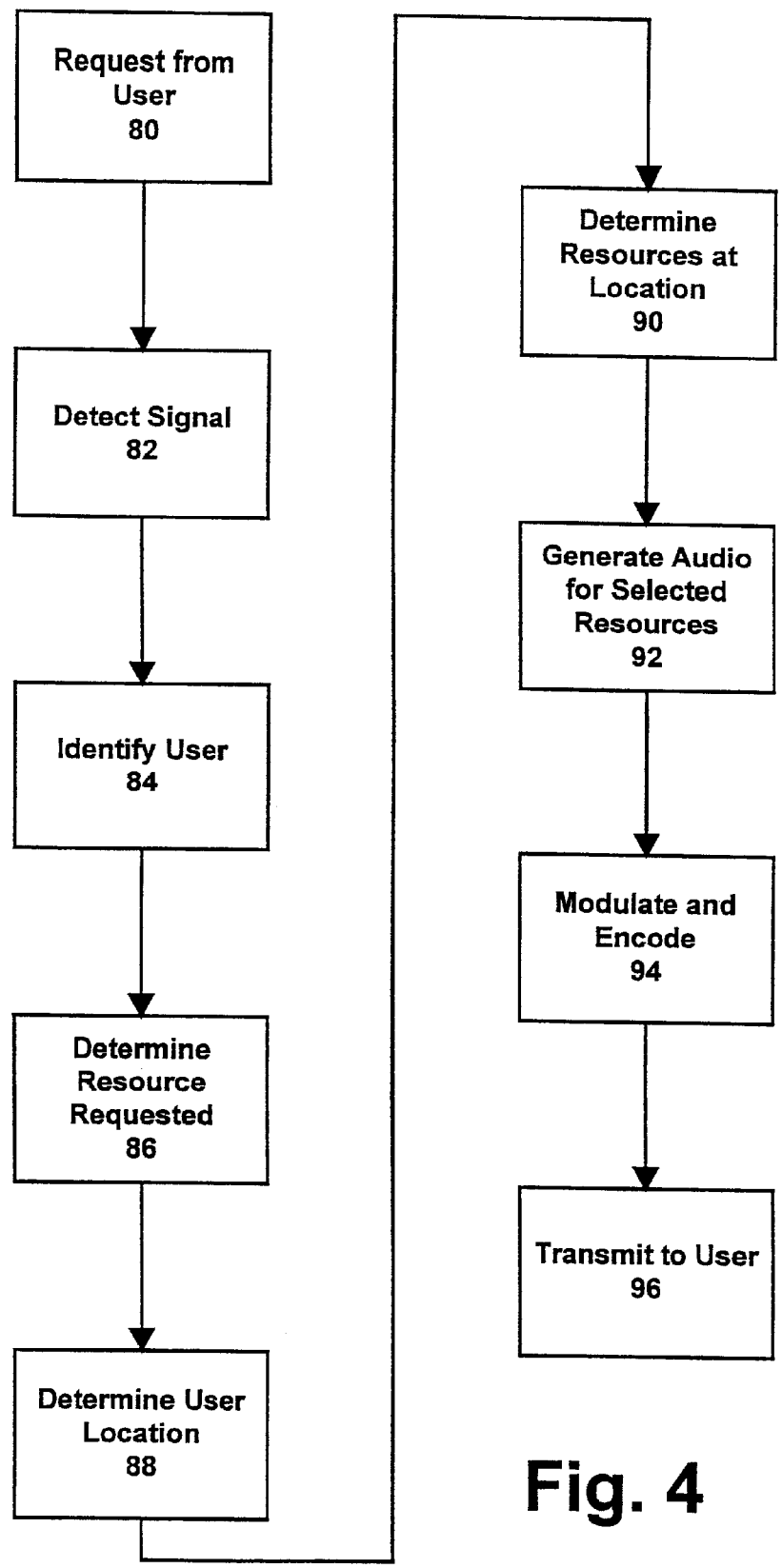
FIG. 4 depicts a flow diagram of the current invention, showing the operation for a single user communicating with the system.

Referring now to FIG. 4, the general operation of the system is seen in block diagram form. The process begins when the user makes a verbal request 80 by speaking into the headset microphone. This request is transmitted, together with the user's identification code, at a radio frequency, and is picked up by the receiver, where it is detected 82, and where the user is identified 84 by means of the user's identification code. The request will contain a number of keywords, which are then identified by the voice recognition system, so that the resource corresponding to the user's request is determined 86.

As an example, suppose the user in the AREA of FIG. 2 wants information concerning restaurants. He will talk into the headset, and may use the words "food", "restaurants", "snacks", etc. The system will contain these as key words, and the voice recognition system, upon detecting any of these key words, will determine that the user is interested in the "Food" resource.

Still referring to FIG. 4, the system will next determine the location 88 of the user. This location determination will use both the current IR sensors activated by the user's IR transmitter, and, if there is no such current IR sensor activation, the last location stored in the system database will be used. The system, via the computer 60, will then determine the resources close to the user's location 80, based on a database of stored resources and locations.

Still referring to FIG. 4, the system generates voice signals corresponding to the resources determined in 96. These voice signals are generated by the voice generation system 60, which combines pre-recorded messages, and voice synthesizer signals. They are then modulated with the RF frequency 94, including encoding to correspond to the particular user which generated the request, and are transmitted back to the user 96.

The user's headset contains electronics which will decode the signal which contains that user's code, and will allow the user to hear the response from the system.

It will be apparent that improvements and modifications may be made within the purview of the invention without departing from the scope of the invention defined in the appended claims.

I claim:

1. A system for locating a person within an area containing resources, for communicating the person's specific interests to the system, and for communicating information regarding the resources related to said interests to the person, comprising:
    (a) a database of interests, of resources related to said interests, and of the geographic locations of said resources;
    (b) an infra-red emitter attached to the person, further comprising means for emitting a signal uniquely identifying and locating the person;
    (c) a multiplicity of infra-red sensors, one located in proximity to each resource;
    (d) radio means for communicating a specific interest from the person to the system, further comprising:
        A. one or more microphones;
        B. one or more voice recognition subsystems;
        C. one or more keyword search subsystems; and
        D. one or more computers;
    (e) means for storing the person's location and specific interests;
    (f) computational means to determine distances and directions from the person to each resource, and to generate instructions for allowing the person to reach said resource, further comprising:
        A. a history database comprising a multiplicity of records, each of which further comprises a time, date, and location of the person; and
        B. extrapolation means to determine the current position of the person based on said history database;
    (g) radio means for communicating from the system to the person, further comprising means to communicate, for each resource related to the person's specific interest;
        A. said resource's location;
        B. a description of the resource;
        C. said instructions for reaching the resource.

2. A method for locating a person within an area containing resources, for communicating the person's specific interests to the system, and for communicating information regarding the resources related to said interests to the person, comprising:
    (a) storing a database of interests, of resources related to said interests, and of the geographic locations of said resources;
    (b) attaching an emitter to the person which generates a signal uniquely identifying and locating the person;
    (c) locating a multiplicity of infra-red sensors, one in proximity to each resource,
    (d) communicating a specific interest from the person to the system by means of:
        A. one or more microphones;
        B. voice recognition means;
        C. keyword means; and
        D. computation means;
    (e) storing the person's location and specific interests;
    (f) determining distances and directions from the person to each resource related to each specific interest, and instructing the person how to reach each resource, further comprising:
        A. creating a history database comprising, for each person, a multiplicity of records, each of which further comprises a time, date, and location; and
        B. extrapolating to determine the current position of the person based on said history database;
    (g) communicating by radio with the person, further comprising, for each resource related to said specific interest:
        A. identifying said resource's location;
        B. identifying characteristics of the resource related to the specific interest; and
        C. communicating instructions for reaching the resource.

* * * * *